United States Patent [19]

Biermann et al.

[11] 3,944,467
[45] Mar. 16, 1976

[54] SPACER FOR FUEL RODS IN NUCLEAR FUEL ELEMENTS

[75] Inventors: Willi Biermann, Bensberg-Refrath; Klaus Iversen, Rosrath near Cologne; Johannes Lohe, Bensberg-Refrath, all of Germany

[73] Assignee: Interatom, International Atomreaktorbau GmbH, Bensberg, Cologne, Germany

[22] Filed: June 11, 1973

[21] Appl. No.: 368,949

Related U.S. Application Data

[63] Continuation of Ser. No. 77,212, Oct. 1, 1970, abandoned.

[30] Foreign Application Priority Data

Oct. 4, 1969  Germany.............................. 1950179

[52] U.S. Cl. ................................................ 176/78
[51] Int. Cl.² .......................................... G21C 3/18
[58] Field of Search ................................. 176/76, 78

[56] References Cited
UNITED STATES PATENTS

| | | |
|---|---|---|
| 3,350,275 | 10/1967 | Venier et al. ............................ 176/78 |
| 3,379,617 | 4/1968 | Andrews et al. ........................ 176/78 |
| 3,380,890 | 4/1968 | Glandin et al. ......................... 176/78 |
| 3,398,053 | 8/1968 | Huber et al. ............................ 176/78 |
| 3,442,763 | 5/1969 | Chetter et al. .......................... 176/78 |
| 3,481,832 | 12/1969 | Rickert .................................... 176/78 |
| 3,575,448 | 4/1971 | Licari .................................. 29/475 X |

*Primary Examiner*—Harvey E. Behrend
*Attorney, Agent, or Firm*—Herbert L. Lerner

[57] ABSTRACT

Spacers for fuel rods in nuclear reactor fuel elements, especially for use aboard ships. Spacers are used in a grid formed by web plates orthogonally intersecting and assembled together in a tooth-comb fashion forming a plurality of channels. The web plates are joined together and each of the web plates includes apertures through which resilient and separator members are joined. The resilient and separator members are in adjacent channels and with other similar members in the same channel, contact a fuel rod in the channel. The contact pressure between the members and fuel rod is radially directed.

8 Claims, 9 Drawing Figures

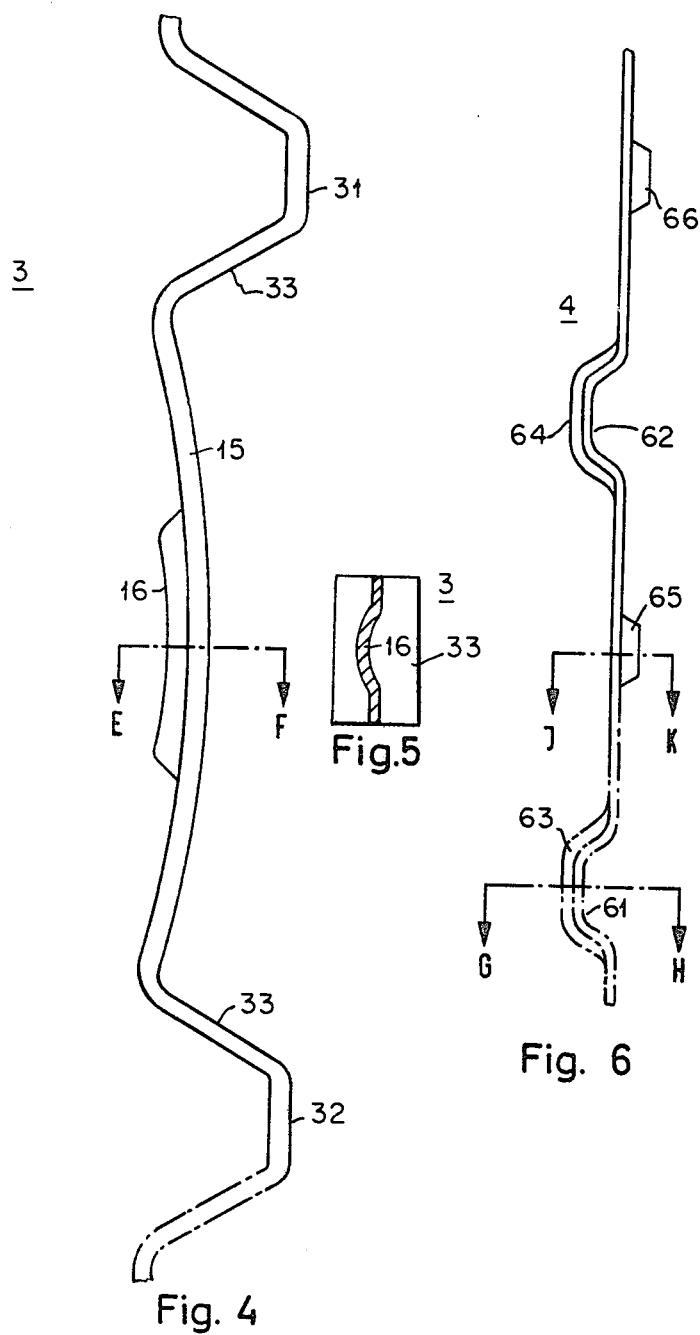
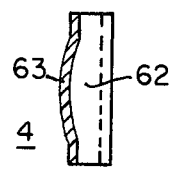
Fig. 7
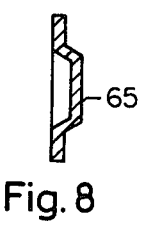
Fig. 8
Fig. 4
Fig. 5
Fig. 6

SPACER FOR FUEL RODS IN NUCLEAR FUEL ELEMENTS

This is a continuation of application Ser. No. 77,212, filed Oct. 1, 1970, now abandoned.

Our invention relates to a spacer for fuel rods used in nuclear-reactor fuel elements, and in a more particular though not exclusive aspect, for nuclear reactors used aboard ship.

In such reactors, each fuel rod is held in individual storage compartments or channels. The compartments or channels are formed by intersecting plates secured together in the form of a grid. These tubes or fuel rods are held in the grid or cluster by spacers and a number of such assemblies form a tube bundle. Each bundle is placed in a suitable enclosure provided with end fittings to permit coolant flow. This assembly is known as a fuel element. Each fuel rod is about 10 to 20 mm thick and several yards long. The spacers are utilized in each channel to maintain the fuel rods firmly in place. The spacers must be relatively strong and yet flexible enough to compensate for dimensional tolerances. The spacers must also abut the fuel rod during oscillations or vibrations to eliminate fretting-corrosion impairment of the extremely thin-walled fuel rod envelope.

The materials used for the construction of fuel channels and spacers must exhibit as slight a neutron absorption characteristic as possible. Zirconium alloys, which have this characteristic, also have very disadvantageous flexible properties and are, therefore, unsuitable for use as resilient spacers. It has been proposed to make the rigid structural components forming the grid of channels of zirconium alloys and the comparatively small flexible spacer members from a material having good resilient qualities, such as stainless steel or high-temperature and corrosion-proof nickel alloys. No material has yet been discovered which exhibits both low neutron absorption and good resilient qualities, and two separate materials each possessing one or the other of these qualities cannot be satisfactorily welded together.

It also has been suggested to provide small notches in the rigid structural components forming the channels into which flexible elements can be inserted before assembly to be fixedly held to serve as spacers. With such a design, however, the flexible or resilient members frequently move inside the individual channels of the grid as it is assembled, so that the assembly, especially of the last fuel rods, is difficult. Further, with this design, the flexible members must be terminated at the ends of the fuel element or at the location of a control rod and then welded firmly to the rigid components forming the channels. A further disadvantage of such a design is that processes such as heat treatment, welding, brazing or etching must be performed subsequent to the assembly of the channels and spacers.

An object of the present invention is to provide spacers for fuel rods exhibiting low neutron absorption and great flexibility to maintain the fuel rod firmly in place.

Another object of the present invention is to provide a spacer assembly for fuel rods which is easy to assemble.

Still another object of the present invention is to provide such a spacer assembly which is relatively inexpensive.

Yet another object of the present invention is to provide such a spacer including members for radially contacting the fuel rod, which members are made of the same material and welded together, thus minimizing metallurgical bond problems previously encountered.

Another object of the present invention is to provide such a spacer assembly in which the spacer members can be connected in individual compartments after the spacer assembly is assembled.

Other objects, advantages, and features of the present invention will become more apparent from the following description.

In accordance with the principles of the present invention, the above objects are accomplished by providing spacers for fuel rods in nuclear reactor fuel elements, especially used with ships, wherein the fuel rods are individually held in channels of a rectangular grid formed of orthogonally intersecting web plates connected in a slotted tooth-comb fashion and soldered together. The plates are made of a material having low neutron absorption characteristics. The web plates form the sides of the channels of the grid and are provided with apertures therein. According to the invention, the flexible or resilient members for holding each fuel rod in place are a flat resilient member having an embossed reinforcement in the contact area with the fuel rod and a separator member of a like material, the resilient and separator members facing each other at the top and bottom of each channel and being attached to other members in adjacent channels through the apertures in the web plates. The fuel rods are held at two opposite contact points with a positive pressure, without a flexing torque being transmitted to the fuel rod. The resilient and separator members are small and since they are connected at respective sides or walls of the channel and are of the same material, and are joined together, they effectively prevent the creep condition.

The invention will be further described with references to embodiments thereof, illustrated by way of example in the accompanying drawing in which:

FIG. 4 is an exploded view of a resilient member used with the present invention.

FIG. 5 is a sectional view through the resilient member taken along lines E–F of FIG. 4.

FIG. 6 is a plan view of a separator member.

FIG. 7 is a sectional view through a projection portion of the separator member taken along lines G–H of FIG. 6.

FIG. 8 is a sectional view through an embossment portion of the separator member taken along lines J–K of FIG. 6.

Figure 2:
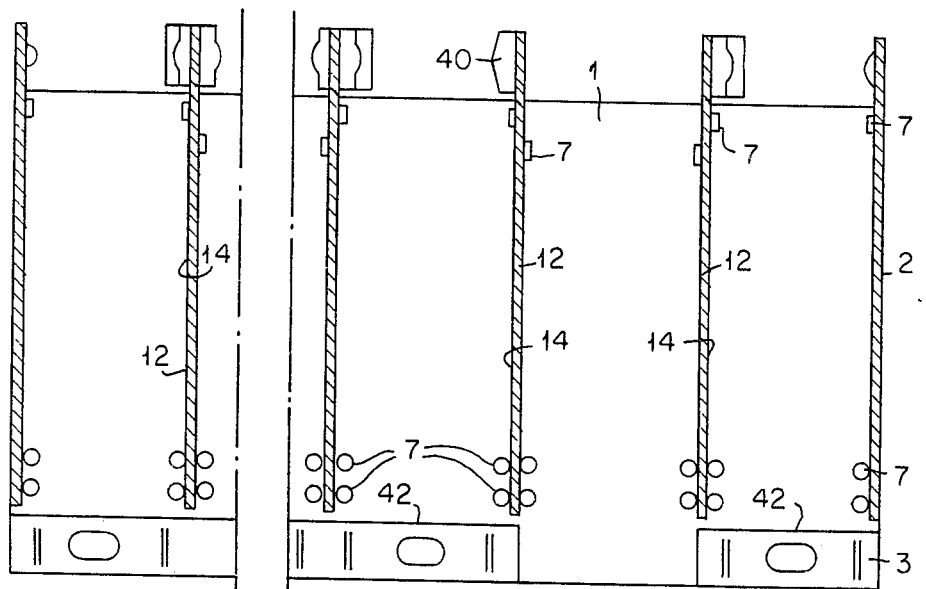
FIG. 2 is a vertical sectional view taken along lines A–B of FIG. 1 through the spacers.
Figure 1:
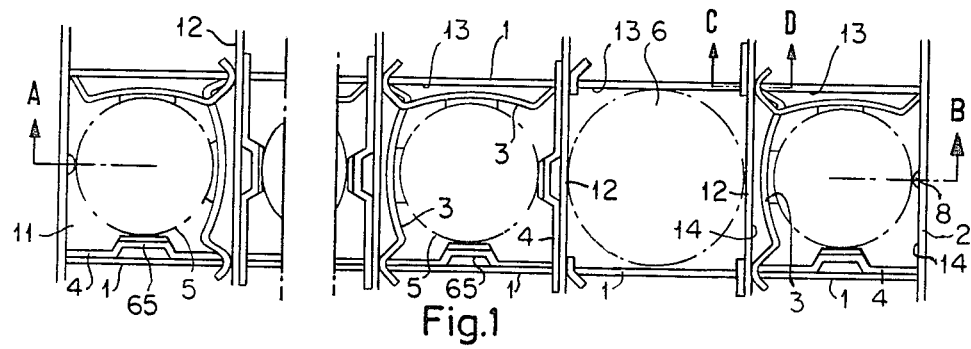
FIG. 1 is a plan view of a portion of a fuel element with spacers according to the invention.

Referring to the illustration, particularly to FIGS. 1 and 2, each fuel rod 5, cylindrical in shape, is housed or held in respective channels 11. The channels are formed by orthogonally interconnecting web plates 1 and 12 respectively fitted together to form a grid. Web plates 1 and 12 are joined in a tooth-comb slotted fashion and are rigidly secured together, as by soldering. A pair of bosses 7 are provided at the intersection of the web plates 1 and 12 to aid their alignment and spacing prior to assembly. These bosses enhance the assembly procedure and insure accurate spacing.

The spacers according to the present invention have the advantage that the intersecting tooth-comb assembly can be joined together prior to the assembly of the resilient and separator members. The bosses 7 allow the distances between the web plates to be accurately fixed, which removes the requirement of complex devices previously required for achieving accuracy between the web plates during the soldered procedure.

Each channel includes two pairs of opposite sides or walls 13 and 14, respectively. A resilient member 3 is fixed at one side of each pair of sides 13 and 14, while a separator member 4 is fixed at the other side of each pair of sides 13 and 14. In these positions, the cylindrical fuel rod is in a point contact with the resilient and separator members. One separator and resilient member are attached at the upper portion 40 of the opposite sides 13, while the other separator and resilient members are connected at the bottom portion 42 of opposite sides 14, as seen in FIG. 2. The resilient members are provided with a convex curved segment 15 having an embossment 16 to stiffen the resilient member. The shape of the convex segment conforms to the cylindrical shape of the respective rod, while contact with the rod is made at the embossment 16.

According to a feature of the present invention, the resilient member 3 is integrally formed consisting of short, straight segments 31 and 32, and a longer, curved segment 15, with the embossment 16 directed towards the fuel rod 5, and intermediate segments 33 inclined at 60° with respect to the web plates forming one of the sides 13. The intermediate segments 33 are located between the short straight segments 31 and 32 and the longer segment 15. This shape for the integral resilient member provides an approximately linear spring characteristic. Although the curved segment 15 conforms to the shape of fuel rod 5, only a small contact area, such as a point, is formed between the rod 5 and embossment 16. The contact pressure is directed radially towards the fuel rod. It can be measured and, if necessary, corrected by means of a taper plug. Also, the resilient member of the present invention may be manufactured by mechanical means in long lengths, which minimizes costs.

The separator members 4 are secured at one side of each pair of sides 13 and 14. FIG. 6 illustrates the separator members 4 in more detail. Each of these members is integrally formed and includes regularly spaced U-shaped segments 61 and 62 projecting towards the fuel rod 5 having embossments 63 and 64, respectively, which contact the cylindrical fuel rod. Additionally, regularly spaced bosses 65 and 66 depend from the separator member in a direction away from the cylindrical fuel rod.

According to the invention, the non-resilient separator members 4 are formed of the same material as are the resilient members 3. The embossments 65 and 66 have a height corresponding to the thickness of the web plate which insures the correct location of U-shaped segments and embossments with respect to the fuel rods. The separator members are also mechanically producible in large scale in great lengths, thus minimizing costs.

Figure 3:
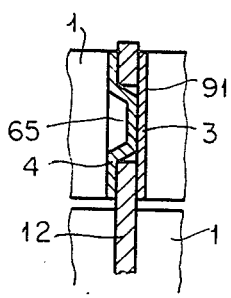
FIG. 3 is a vertical sectional view of a detail taken along lines C–D of FIG. 1.
Figure 3A:
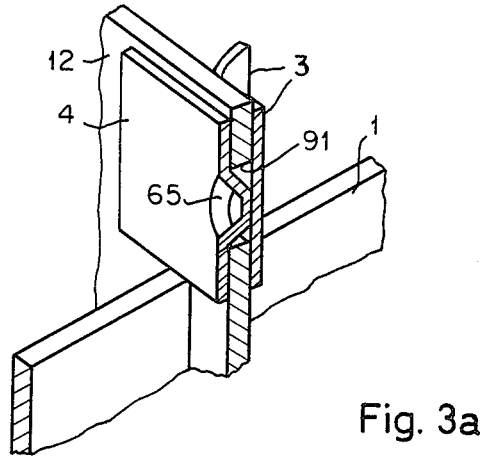
FIG. 3a is a perspective view of the same detail.

FIG. 3 is a sectional view taken along lines C–D of FIG. 2 illustrating contiguous compartments or channels and the interconnection of the flexible and separator members at the sides of respective channels; and FIG. 3a shows the same interconnection in perspective. Web plate 12 interconnects with web plate 1 in the area of the break between plates 1. Each web plate, such as illustrated for web plate 12, is provided with an aperture 91 into which a boss 65 of separator member 4 is fitted. A resilient member 3 is located on the opposite side of plate 12 in the adjacent channel, and is joined or welded to the separator member at the boss segment 65 thereof. Spot welding may be employed to join the two members which are made of similar material.

In accordance with a feature of the present invention, the spacer members 3 and 4 are not joined to the web plates which are of a different material, but to each other, thus eliminating the problems associated with welding two different materials with different characteristics.

Channel 6 is empty and may contain a suitable control rod made of an efficient neutron absorber in a conventional manner. The resilient and separator members are not utilized in this channel since a fuel rod is not housed therein.

A web plate 2 is located at the ends of the grid and terminate web plates 1. Web plate 2 is similar in form to web plates 1 and 12 and replaces web plate 12 at the extremities of the grid. Web plate 2 is soldered to web plates 1 to form a secure structural assembly. As seen in FIGS. 1 and 2, one of the separator members 4 is not utilized in the end channel formed by plate 2, and an embossment 8 is formed on the inner side of web plate 2. Embossment 8 is located at the top portion 40 of the end channel and abuts against the fuel rod held therein. Clearly, a separator member 4 could be used in the stead of embossment 8.

FIG. 5 is a cross-sectional view taken along lines E–F of FIG. 4 through the curved segment 15 with the embossment 16 of the resilient member 3. FIGS. 7 and 8 are sectional views taken along lines G–H and J–K, respectively, of FIG. 6 illustrating the U-shaped segments 61 or 62 and the bosses 65 or 66, respectively.

According to our invention, the resilient members are transverse to the fuel rod axis over the width of the fuel element and are terminated at channel 6 where a control rod is provided. These resilient members can be produced in long lengths and have the advantage that even if a spot weld fails, the member nevertheless remains firmly in place due to the other spot weld points between the continuous resilient and separator members joined in the apertures of the web plates. In the channel for the control rods, the resilient members are not utilized, so that the entire cross-sectional area of this channel can be used for the control rods and their guideways. The members located transverse to the fuel rod axis have an ample open cross-sectional area in the direction of flow, with opposite springs directed parallel to the fuel rod axis.

It will thus be seen that the objects set forth above, among those made apparent from the preceding description, are efficiently attained and, since certain changes may be made in the above method and apparatus without departing from the scope of the invention, it is intended that all matter contained in the above description and shown in the accompanying drawings shall be interpreted as illustrative and not in a limiting sense.

We claim:

1. Spacers for positively positioning fuel rods in nuclear reactor fuel elements including: a plurality of web plates disposed in orthogonally intersecting relation to other web plates and being joined along common contact surfaces to form a network of individual compartments for holding said fuel rods; said compartments being defined by two pairs of opposite walls having upper and lower portions; apertures formed in each of said web plates to thereby define a wall passage between adjacent compartments; first and second one piece resilient members; said resilient members, each being respectively disposed on a first pair of two adjacent sides of said opposite walls; said resilient members each having an integral segment at one end thereof, extending through said aperture into an adjacent compartment; said first resilient member being juxtapositioned with respect to said upper portion and said second resilient member being juxtapositioned with respect to said lower wall portion; first and second separator members; said separator members each being of a same material as said resilient members and juxtapositioned with respect to a second pair of two adjacent sides of said opposite walls and protuberances integral with said separator members extending into said apertures toward adjacent compartments and being in communication with said resilient member segments, said separator members being joined in said apertures with said resilient members at a point of contact formed between said protuberances and said segments.

2. Spacers for fuel rods as set forth in claim 1, wherein a pair of bosses are attached to said plurality of web plates and straddle the other orthogonally intersecting web plates.

3. Spacers for fuel rods as set forth in claim 1, wherein said resilient members exert radial pressure on the respective fuel cells.

4. Spacers for fuel rods as set forth in claim 1, wherein said separator and resilient members are of the same material.

5. Spacers for fuel rods as set forth in claim 1, wherein said separator member is integrally formed of spaced U-shaped segments projecting towards said fuel rod and alternately spaced bosses with each of said bosses adapted to fit into said aperture through one wall of a respective web plate.

6. Spacers for fuel rods as set forth in claim 5, wherein said separator member is joined with a resilient member on the other wall of said web plate by spot welding said bosses to said resilient member in said aperture.

7. Spacers for positively positioning fuel rods in nuclear reactor fuel elements including: a plurality of web plates disposed in orthogonally intersecting relation to other web plates and being joined along common contact surfaces to form a network of individual compartments for holding said fuel rod; said compartments being defined by two pairs of opposite walls having upper and lower portions; apertures formed in each of said web plates to thereby define a wall passage between adjacent compartments; first and second one piece resilient members; said resilient members, each being respectively disposed on a first pair of two adjacent sides of said walls; said resilient members each having an integral segment at one end thereof, extending through said aperture into an adjacent compartment; said first resilient member being juxtapositioned with respect to said upper portion and said second resilient member being juxtapositioned with respect to said lower wall portion; first and second separator members; said separator members each being of a same material as said resilient members and juxtapositioned with respect to a second pair of two adjacent sides of said walls and protuberances integral with each of said separator members; said protuberances each extending into said apertures toward adjacent compartments and being in communication with respective resilient member segments of adjacent compartments in said apertures, such resilient members being defined by integrally formed short straight segments followed by intermediate segments connecting said straight segments to curved segments, said intermediate segments forming a 60° angle with a respective wall of a respective compartment.

8. Spacers for fuel rods as set forth in claim 7, wherein an embossment is attached to said curved segment and contacts said fuel rod.

* * * * *